United States Patent [19]

Bevege et al.

[11] Patent Number: 4,775,416
[45] Date of Patent: Oct. 4, 1988

[54] TIMBER BRANDING

[75] Inventors: David I. Bevege, Pymble; Alexandre Krilov, Pennant Hills, both of Australia

[73] Assignee: The Minister for Natural Resources of the State of New South Wales, Sydney, Australia

[21] Appl. No.: 812,241

[22] Filed: Dec. 23, 1985

[30] Foreign Application Priority Data

Dec. 24, 1984 [AU] Australia .............................. PG8711

[51] Int. Cl.$^4$ .............................................. C09D 11/00
[52] U.S. Cl. .................................. 106/19; 106/286.1; 106/286.3; 427/258
[58] Field of Search ............. 106/19, 20, 286.3, 286.8, 106/286.1; 427/258

[56] References Cited

U.S. PATENT DOCUMENTS 4,505,944  3/1985  Turner ................................ 106/19

FOREIGN PATENT DOCUMENTS 854676  10/1970  Canada .

Primary Examiner—Josephine Barr
Attorney, Agent, or Firm—Fulwider, Patton, Rieber, Lee & Utecht

[57] ABSTRACT

Freshly sawn green timber is branded with identification or grading symbols using an aqueous acid solution of ferric ions to produce blue-black markings. A suspension of iron oxides in a solution of ferric chloride and ferric nitrate produced by dissolving iron in a mixture of hydrochloric and nitric acids gives particularly good results.

10 Claims, No Drawings

TIMBER BRANDING

FIELD OF THE INVENTION

This invention relates to the branding of timber and is related especially, but not exclusively, to the branding of freshly-sawn timber.

BACKGROUND

The term "branding" means the marking of timber with identification symbols relating to the type or quality (grade) of the timber. After the timber has been felled it is normal to rough saw the green timber before it is dried. The green timber has a high moisture content (e.g. greater than 100% for softwoods and up to 150% for hardwoods) and must be dried before use, usually outdoors or in a kiln. Green timber is particularly difficult to brand on account of the high water content. Moreover hardwood is generally wetted during sawing as the saw blade often has to be cooled with a water spray.

Existing methods of branding freshly-sawn timber involve the use of various types of ink which provide neither distinctly legible grades of mark nor marks which can be maintained on the timber for a sufficient length of time, particularly in view of the rigorous conditions under which sawn timber is transported, stored and worked.

In particular, the branding must show satisfactory water resistance for storage outdoors. As timber is quickly passed out of the saw mill the brand must also be capable of drying within a short time. Typically less than 5 to 10 minutes. The branding fluid must also be economical and compatible with existing equipment.

It is an object of the present invention to mitigate these disadvantages associated with known methods of branding timber.

DESCRIPTION OF THE INVENTION

It has now been discovered that excellent branding may be achieved by applying an iron salt to the timber so as to generate in-situ a blue-black stain produced by the reaction of the iron with polyphenols (e.g. tannins) in the wood. The staining of wood with iron has been known for a long time and dyes for timber have been proposed on the basis of this reaction (for example, Canadian patent specification No. 854676). The present invention is based on the surprising discovery that under certain necessary conditions, the reaction may be utilised to fulfill the requirements of a branding system.

In particular the present invention provides a method of branding sawn timber which comprises applying to a surface of the sawn timber a branding fluid comprising an aqueous solution of $Fe^{III}$ ions and an acid to render the solution acidic, so as to brand the timber surface with identification symbols.

The ferric ions react with the polyphenols present in the wood to give a blue-black colour or precipitate of complex chemical structure. Under acid conditions the reaction occurs rapidly enough to be suitable for branding; and the acid is in fact very compatible with existing equipment, keeping it clean and preventing clogging. Once dried, the brand shows good water resistance.

The ferric ions are preferably in the form of ferric chloride, ferric nitrate or a mixture thereof.

It has been found that particularly good results may be obtained using a branding fluid which also includes a suspension of iron oxides, which seem to give a clearer brand possibly by promoting the reaction between the ferric ions and the polyphenols and/or by acting as a pigment. This may be produced by dissolving iron in a mixture of hydrochloric and nitric acids. The acids will generally each be present in an amount of 2 to 10% wt/vol so as to dissolve the iron and produce an acid solution. Preferably the hydrochloric and nitric acids are present in the ratio of 2:1 to 1:2 by weight. The iron oxides are believed to be a mixture of various hydrated iron oxides such as $FeO$, $Fe_2O$, $Fe_2O_3$ and $Fe_3O_4$. The suspension reacts rapidly with the polyphenols.

Preferably, the total iron content of the branding fluid is in a weight ratio of 2 to 10%, for example 3 to 7%.

Generally the pH of the branding fluid is less than 5, preferably less than 4 and advantageously 1 to 3.

The method is particularly useful for green timber, which has been rough sawn prior to drying. It is particularly useful for hardwood but also gives good results with softwoods. Typical hardwoods include blackbutt, turpentine, jarrah and karri. Typical softwoods include radiata pine, cypress pine and douglas fir. Hardwoods usually have a high polyphenol content, but surprisingly the method also works well with timber such as brushbox which has a very low polyphenol content.

However, with timber having a low polyphenol content it is preferred to also include a dye such as Chromazurol-S in the branding fluid to give a darker colour.

Although it is not generally necessary, if the timber is to be immediately exposed to wet conditions, it may be desirable to cover the brand with a protective film of a clear film-forming material e.g. polyvinyl chloride.

Embodiments of the invention will now be described by way of example only. The Examples include solutions of ferrous ions and alkaline solutions also for comparison purposes.

DESCRIPTION OF PREFERRED EMBODIMENTS

EXAMPLE 1

In tests carried out in this first Example, a range of iron compounds in various solutions or suspensions were used, a detailed description of the materials being provided in Table 1.

TABLE 1

CHEMICALS USED FOR BRANDING ROUGH SAWN GREEN HARDWOOD - EXAMPLE 1

| CODE No. | SOLUTION | FORMULA | WEIGHT/VOL. RATIO % | REMARKS |
|---|---|---|---|---|
| 1 | FERROUS SULPHATE | $FeSO_4.7H_2O$ | 5 | Comparison |
| 2 | IRON WIRE dissolved in mixed acid | Fe in 10% $\begin{cases} HCl \\ HNO_3 \end{cases}$ | 1 | invention |

TABLE 1-continued

CHEMICALS USED FOR BRANDING ROUGH SAWN GREEN HARDWOOD - EXAMPLE 1

| CODE No. | SOLUTION | FORMULA | WEIGHT/VOL. RATIO % | REMARKS |
| --- | --- | --- | --- | --- |
| 3 | IRON WIRE dissolved in mixed acid | Fe in 12.5% {HCl, $HNO_3$} | 5 | invention |
| 4 | FERRIC NITRATE | $Fe(NO_3)_3 \cdot 9H_2O$ | 5 | invention |
| 5 | FERRIC NITRATE | $Fe(NO_3)_3 \cdot 9H_2O$ | 10 | invention |
| 6 | FERRIC CITRATE | Fe + HOCCOOH with two $CH_2COOH$ groups | 5 | invention |

To cover adequately the range of colours appearing on certain Australian East Coast hardwoods and to provide a comprehensive assessment of the marking potential for each solution used, two distinctly coloured timber species were selected, namely, blackbutt (*Eucalyptus pilularis*) and turpentine (*Syncarpia glomulifera*), which have light and dark coloured woods, respectively.

Both species of wood were freshly sawn into 100×50×120 mm samples, each capable of accommodating three markings per side. A standard rubber stamp of 40 mm diameter was used for this purpose.

Equal quantities of each solution shown in Table 1 were poured over a piece of clean felt placed within a separate plastics container, to eliminate any possible contamination with other chemicals. Then, all the samples were marked.

There were three samples per species and chemical used. Each sample was treated differently;

First sample: stamped only and assessed immediately;

Second sample: stamped, hosed with water and assessed after two hours; and

Third sample: stamped, exposed to weathering for two weeks and then assessed.

The results are summarised in Table 2.

TABLE 2

QUALITATIVE ASSESSMENT OF BRANDING - EXAMPLE 1
CLEAR = BLACKBUTT
DARK = TURPENTINE

| SOLUTION CODE No. | AT ROOM TEMPERATURE TREATMENT: stamped only ASSESSED: Immediately | | AT ROOM TEMPERATURE TREATMENT: stamped, sprayed with water ASSESSED: after 2 hours | | EXPOSED TREATMENT: stamped, weathered ASSESSED: after 2 weeks | | OBSERVATIONS |
| --- | --- | --- | --- | --- | --- | --- | --- |
| | CLEAR | DARK | CLEAR | DARK | CLEAR | DARK | |
| 1 | 4 | 4 | 4 | 4 | 4 | 4 | excessive spread of stain |
| 2 | 4 | 3 | 4 | 4 | 1 | 4 | not water proof |
| 3 | 2 | 2 | 2 | 2 | 1 | 2 | water resistant |
| 4 | 4 | 3 | 4 | 4 | 4 | 4 | excessive staining: not water proof |
| 5 | 1 | 2 | 4 | 4 | 2 | 2 | dry weather resistant: not water proof |
| 6 | 2 | 2 | 4 | 4 | 3 | 3 | same as No. 5 |

QUALITY OF MARKING
1 = very good
2 = good
3 = fair
4 = poor

Table 2 indicates clearly that although a number of chemicals have provided an acceptable quality of marking at room temperature, the same solutions failed completely on samples which were either sprayed or weathered. Under industrial conditions, both these tests are of the greatest importance for practical assessment of the finished product. Fluid 3, namely, iron wire dissolved in a mixture of hydrochloric and nitric acids at 12.5%, produced encouraging results.

Table 2 indicates also that the results produced by both ferric nitrate at 10% (fluid 5) and the ferric citrate at 5% (fluid 6), are significantly better than those obtained by other chemicals.

EXAMPLE 2

Fluids 3 and 5 from Example 1 were assessed in more detail in different weight/volume ratios. Fluid 6 from Example 1 was not tested further. At the same time, seven additional iron compounds were tested.

Detailed information relating to all these is provided in Table 3.

TABLE 3

CHEMICALS USED FOR BRANDING ROUGH-SAWN GREEN HARDWOOD - EXAMPLE 2

| CODE No. | SOLUTION | FORMULA | WEIGHT/VOLUME RATIO % | REMARKS |
| --- | --- | --- | --- | --- |
| 3A | IRON WIRE dissolved in mixed acid | Fe in 10% v/v {HCl, $HNO_3$} | 3 | invention |

TABLE 3-continued

CHEMICALS USED FOR BRANDING ROUGH-SAWN GREEN HARDWOOD - EXAMPLE 2

| CODE No. | SOLUTION | FORMULA | WEIGHT/VOLUME RATIO % | REMARKS |
|---|---|---|---|---|
| 5A | FERRIC NITRATE | $Fe(NO_3)_3.9H_2O$ | 20 | invention |
| 5B | FERRIC NITRATE | $Fe(NO_3)_3.9H_2O$ | 40 | invention |
| 6A | FERRIC CITRATE | $Fe + HOC(CH_2COOH)_2COOH + 10\%\ v/v\ HCl$ | 10 | invention |
| 6B | FERRIC CITRATE | $Fe + HOC(CH_2COOH)_2COOH + 10\%\ v/v\ NH_4OH$ | 10 | comparison |
| 7 | AMMONIUM FERRIC SULPHATE | $NH_4Fe(SO_4)_2.12H_2O$ | 10 | comparison |
| 8 | AMMONIUM FERROUS SULPHATE | $(NH_4)_2Fe(SO_4)_2.6H_2O$ | 10 | comparison |
| 9 | AMMONIUM FERRIC CITRATE | $NH_3 + Fe + HOC(CH_2COOH)_2COOH$ | 10 | comparison |
| 10 | FERRIC CHLORIDE | $FeCl_3.6H_2O$ | 10 | invention |

Both timber species, namely, blackbutt and turpentine, which were used in Example 1, provided the necessary samples. Sample dimensions were the same as those used in Example 1, with the only exception of width, which was halved to accomodate three, instead of six, markings per side. In this instance, however, two sides of each sample were marked, thus providing a sufficient number of markings per test to be statistically comparable with the results obtained in Example 1.

The total number of samples prepared for this experiment was six per species and per fluid used.

The method of marking samples was the same as that used in the previous Example 1.

Complete results of Example 2 are provided in Table 4.

The method of assessment was identical to that used in Example 1.

The markings of the first batch of samples were assessed at room temperature immediately after being stamped, whilst the samples of the second batch were sprayed with water and examined after two hours. The last batch of samples was stamped, weathered for a period of two weeks and then assessed.

The qualitive assessment of the samples which were sprayed with water and/or weathered in fairly severe atmospheric conditions for a considerable period of time, is important insofar as the selection of the most suitable fluid for marking freshly cut timber is concerned.

It was observed that the effectiveness of all the fluids was greatly reduced, if fresh markings on the timber were subjected to an excess of water. Thus, all weathered samples were exposed to rainy conditions prevailing at the time of trial. The direct effect of this was a spread of stain, in some instances, resulting sometimes in an almost complete removal of the compound applied to the timber surfaces.

An explanation is that, in a sufficient concentration, the iron and the polyphenolic substances in timber are able to interact and produce an irreversible reaction in

TABLE 4

QUALITATIVE ASSESSMENT OF BRANDING - EXAMPLE 2
CLEAR = BLACKBUTT
DARK = TURPENTINE

| SOLUTION CODE No | AT ROOM TEMPERATURE TREATMENT: stamped only ASSESSED: Immediately | | AT ROOM TEMPERATURE TREATMENT: stamped sprayed with water ASSESSED: after 2 hours | | EXPOSED TREATMENT: stamped, weathered ASSESSED: after 2 weeks | | OBSERVATIONS |
|---|---|---|---|---|---|---|---|
| | CLEAR | DARK | CLEAR | DARK | CLEAR | DARK | |
| 3A | 2 | 2 | 1 | 2 | 3 | 2 | water resistant: acceptable spread of stain |
| 5A | 2 | 2 | 1 | 3 | 3 | 3 | water resistant: staining greater than 3A |
| 5B | 2 | 3 | 1 | 3 | 4 | 3 | water resistant: excessive spread of stain |
| 6A | 2 | 4 | 4 | 4 | 4 | 4 | not weather resistant: not water proof |
| 6B | 3 | 4 | 4 | 4 | 4 | 4 | not water proof |
| 7 | 3 | 4 | 3 | 3 | 4 | 3 | excessive spread of stain |
| 8 | 4 | 4 | 4 | 4 | 4 | 4 | not water proof: excessive spread of stain |
| 9 | 2 | 4 | 1 | 2 | 3 | 4 | slightly resistant to water |
| 10 | 4 | 4 | 4 | 4 | 4 | 4 | excessive spread of stain | the aqueous phase. This reaction is complete and irreversible only after a certain period of time, which is necessary for permanent branding of the timber. By adding excess water before permanent fixation of the brand occurs, efficiency of this chemical reaction is greatly decreased in conjunction with the reduction in concentration of both reactants.

This indicates that after a proper chemical reaction has taken place, the most important parameter for qualitative assessment of samples becomes the resistance of the marking to an excess of water. To achieve a good quality brand, a fairly short stabilising fixation time of not more than 15 minutes, is preferably required.

It is, however, preferable not to rely on this extra time for stabilising the polyphenolic reaction and permanently fixing the marking, as in normal industrial practice, the marked timber is usually conveyed from a mill without delay. This problem of mark stabilisation, therefore, can be solved preferably by reducing this extra time to a minimum.

Example 2 suggests that fluids 3A and 5A, and to a lesser extent fluid 5A, are suitable for marking green timber and were investigated further in a subsequent third Example to be discussed below.

The results can be summarised as follows:
1. Of the whole series of fluids used for chemically marking fresh, rough-sawn hardwoods, two, namely, fluids 3A and 5A, were found to be very acceptable.
2. Although the best was fluid 3A, it was still considered to be slightly inferior to fluid 3 of Example 1.
3. All the fluids were selected, tested and assessed on the basis of their resistance to water, a factor which was important for industrial application.

EXAMPLE 3

The two best fluids, namely, ferric nitrate and iron suspension, from Examples 1 and 2, were selected for assessment.

Details of these fluids referenced 3, 3A, 5A and 5C are provided in Table 5:

heating gently in a water bath. After 15 minutes, a further 30 ml of water were added and the heat removed. 15 ml of concentrated nitric acid were then added very cautiously to the mixture. The reaction is vigorous and produces poisonous fumes of nitrogen dioxide, and consequently the entire procedure was carried out in a fume cupboard. The beaker was then placed on a water bath and heated. More water was added to ensure that the mixture did not dry out. The beaker was left on the water bath until all the wire had dissolved, the volume then being made up to 200 ml. The fluid produced comprised a solution of ferric chloride and ferric nitrate with iron oxides suspended therein.

The composition of the iron wire used for the manufacture of the suspension by weight was carbon 0.03%, sulphur 0.02%, manganese 0.04%, phosphorus 0.002%, silicon 0.001% and iron 99.89%.

The iron wire could have been replaced effectively by the same amount of technical grade iron filings which are generally cheaper.

Branding tests

In this Example, two different weight/volume ratios for each compound were used. Details of both compounds in different concentrations are provided in Table 5.

Freshly milled samples of the same two species used in previous Examples 1 and 2, namely, blackbutt and turpentine, were prepared.

The size of these samples was somewhat larger than that used in the previous experiments, in order to accomodate a minimum of six and a maximum of eight markings per side. Two sides of each sample were marked and, in total, there were six samples branded per species and per compound of a different concentration.

The method of sample marking in Example 3 was the same as that used in both previous Examples.

The previous two Examples suggested that a severe weathering test could be considered as an indication as to whether a chemical compound used for marking or branding was sufficiently resistant to adverse conditions

TABLE 5

CHEMICALS USED FOR BRANDING
ROUGH-SAWN GREEN HARDWOOD - EXAMPLE 3

| CODE No. | SOLUTION | FORMULA | WEIGHT/VOLUME RATIO % | REMARKS |
|---|---|---|---|---|
| 3 | IRON WIRE dissolved in mixed acid | Fe in 12.5% v/v { HCl, $HNO_3$ } | 5 | invention |
| 3A | IRON WIRE dissolved in mixed acid | Fe in 10% v/v { HCl, $HNO_3$ } | 3 | invention |
| 5A | FERRIC NITRATE | $Fe(NO_3)_3 \cdot 9H_2O$ | 20 | invention |
| 5C | FERRIC NITRATE | $Fe(NO_3)_3 \cdot 9H_2O$ | 10 | invention |

Preparation of iron suspension (fluid 1)

10 g of iron wire was placed in a tall 400 ml beaker. The wire was covered by 10–20 ml of water, followed by 10 ml of concentrated hydrochloric acid, whilst which are common in industrial practice. For this reason, subsequent assessment of results was based on weathered samples only.

The results of the qualitative assessment of branding in Example 3 are provided in Table 6.

TABLE 6

QUALITATIVE ASSESSMENT OF BRANDING - EXAMPLE 3
CLEAR = BLACKBUTT
DARK = TURPENTINE

| SOLUTION CODE No. | EXPOSED | | | | OBSERVATIONS |
|---|---|---|---|---|---|
| | NORMAL TREATMENT: stamped, weathered ASSESSMENT: after 2 weeks | | SPECIAL TREATMENT: stamped, coated, weathered ASSESSED: after 2 weeks | | |
| | CLEAR | DARK | CLEAR | DARK | |
| 3 | 1 | 2 | 1* | 1* | weather resistant |
| 3A | 3 | 4 | 2 | 2 | slightly resistant to weather if coated |
| 5A | 3 | 4 | 3 | 2 | not resistant to weather |
| 5C | 4 | 4 | 4 | 4 | not resistant to weather |

QUALITY OF MARKING
1 = very good
2 = good
3 = fair
4 = poor
* = extra good

Half the samples used in this Example were also submitted to a special treatment by vinyl spray coating, as in the previous Examples 1 and 2, it was observed that the quality of markings deteriorated on most samples subjected to an excess of water at the moment of branding. In this respect, all the samples were affected one way or another, including those marked by fluids 3 which, being more resistant to an excess of water than the other compounds, provided consistently the best results.

It was suggested, therefore, that a protective coating, applied immediately over fresh markings, might provide an improved result. Thus, half the samples used in Example 3 were treated with a commercially available VIKEM spray, capable of forming instantaneously a dialectically strong and durable vinyl film over each freshly-branded sample of timber (indicated as "special" in Table 6).

Qualitative assessment of all the samples was carried out after two weeks of exposure in harsh atmospheric conditions, characterised essentially by heavy and continuous rain fall. After this preliminary assessment, all the samples remained at the exposure site for the next four weeks, when they were re-assessed.

The results obtained in Example 3 indicate that the best fluid capable of reacting vigorously with polyphenolics in wood to produce a neat and durable mark of rough-sawn timber, is fluid 3. The optimum volume/weight ratio is 5%. However, other fluids may be used when an excess of water is not present.

The weathered samples, which were sprayed with the vinyl composition, were completely waterproof and visually looked better than those submitted to the "normal" treatment. It was observed that a short delay in spraying produced better results, those samples, which prior to exposure were kept for one hour under cover and then sprayed, being of extremely good quality.

As far as the various timber species are concerned, it would appear that there is no significant difference in the quality of branding or marking. Indeed, the markings on both clear and dark woods used in Example 3 were equally well readable and of a good quality.

EXAMPLE 4

Further tests were carried out upon the Australian hardwood with the lowest polyphenol content, namely, brushbox (*Lophostemon confertus*), using the iron solution 3 from Examples 1 and 3 above. The results of these test provided very good marking qualities, of the order of 1 in the quality of marking scales in Tables 2, 4 and 6 above.

Additional tests were also conducted upon two further hardwood Eucalyptus species, namely, jarrah (*Eucalyptus marginata*) and karri (*Eucalyptus diversicolor*), with excellent marking qualities of 1* from the Tables above.

In both the further and additional tests upon brushbox, and jarrah and karri, the timber samples were freshly rough-sawn. Similarly, yet further tests were conducted upon freshly rough-sawn samples of three softwoods, again with excellent marking results of the order of 1* in the Tables above. These three softwoods were Radiata pine (Pinus radiata). Cypress pine (*Callitris columellaris*) and Douglas fir (*Pseudotsuga menziesii*). Thus, it can be seen that the branding method is effective in relation to both hardwoods and softwoods.

We claim:

1. A fluid for branding the surface of a timber with identification markings relating to the type or quality of the timber, in the form of an aqueous acidic suspension, which comprises:
   (i) an aqueous solution of $Fe^{III}$ ions and an amount of a mixture of hydrochloric and nitric acid in a ratio of 2:1 to 1:2 by weight such as to render the solution acidic, and
   (ii) a suspension of iron oxide suspended in said aqueous solution,
   the iron content of the fluid being from 2 to 10% wt/vol; the fluid being reactive with polyphenols in the timber to produce blue-black identification markings thereon.

2. A fluid according to claim 1 wherein the aqueous acidic suspension has been produced by reacting iron with a mixture of aqueous hydrochloric and nitric acids so as to produce an acidic solution containing $Fe^{III}$ ions in the form of ferric chloride and ferric nitrate and having iron oxide suspended therein.

3. A fluid according to claim 2 wherein the mixture of acids comprises 2 to 10% wt/vol of concentrated hydrochloric acid, and 2 to 10% wt/vol of concentrated nitric acid.

4. A fluid according to claim 1 wherein the fluid contains 3 to 7% wt/vol of iron.

5. A fluid according to claim 1 having a pH in the range 1 to 3.

6. A fluid according to claim 1 wherein the timber is rough sawn timber.

7. A fluid according to claim 1 wherein the timber is freshly sawn green timber.

8. A fluid according to claim 1 wherein the timber is a hardwood.

9. A fluid according to claim 1 wherein the suspension of iron oxide comprises a mixture of hydrated iron oxides selected from FeO, Fe$_2$O, Fe$_2$O$_3$ and Fe$_3$O$_4$.

10. A fluid for marking the surface of timber with identification markings relating to the type or quality of the timber, which comprises a suspension formed by reacting iron with a mixture of aqueous hydrochloric and nitric acids in a ratio of hydrochloric to nitric acids of about 2:1 to 1:2 by weight so as to produce an acidic solution containing Fe$^{III}$ ions in the form of ferric chloride and ferric nitrate and having iron oxide suspended therein; the iron content of the fluid polyphenols in the timber to produce blue-black identification markings thereon.

* * * * *